UNITED STATES PATENT OFFICE.

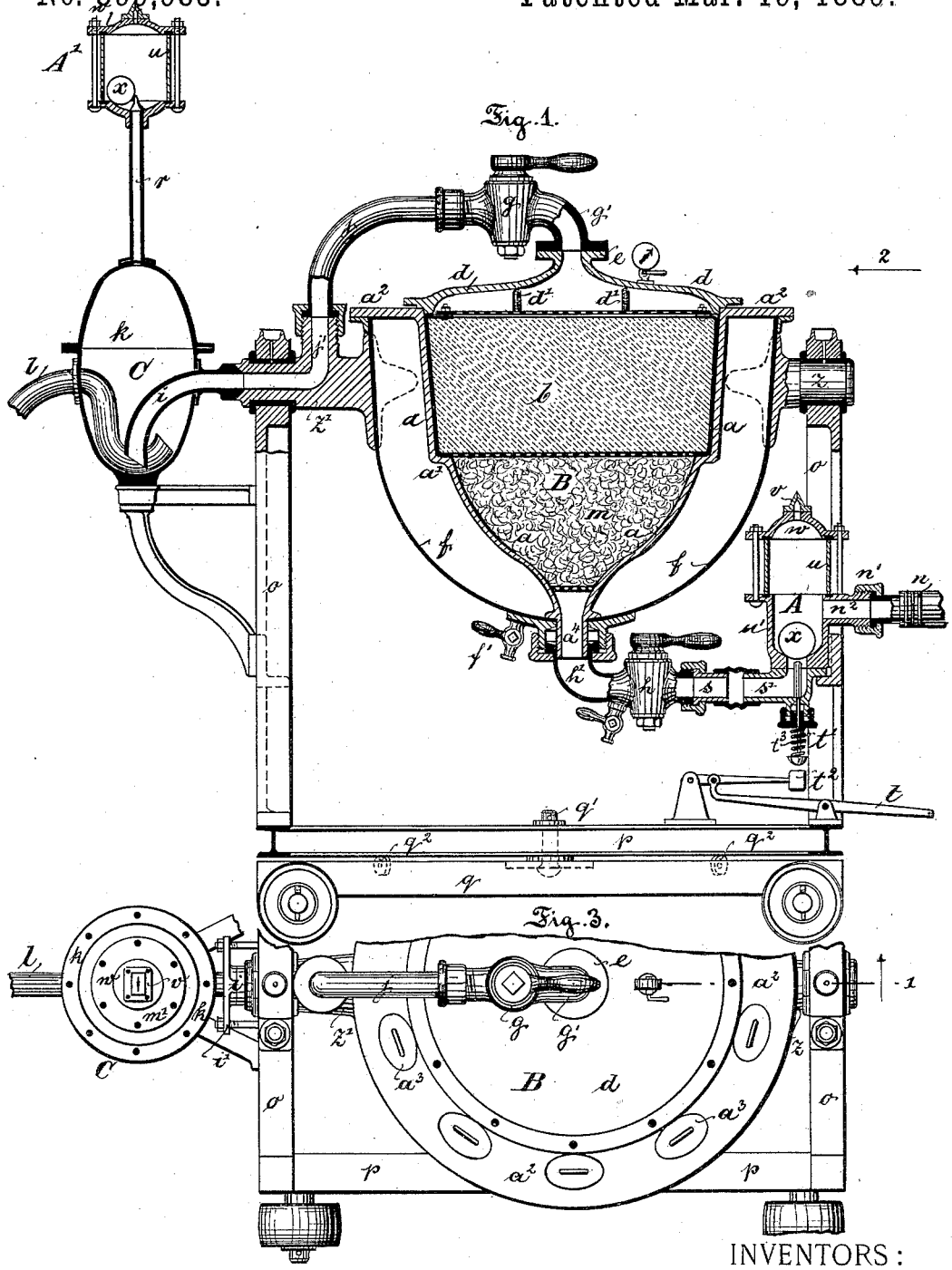

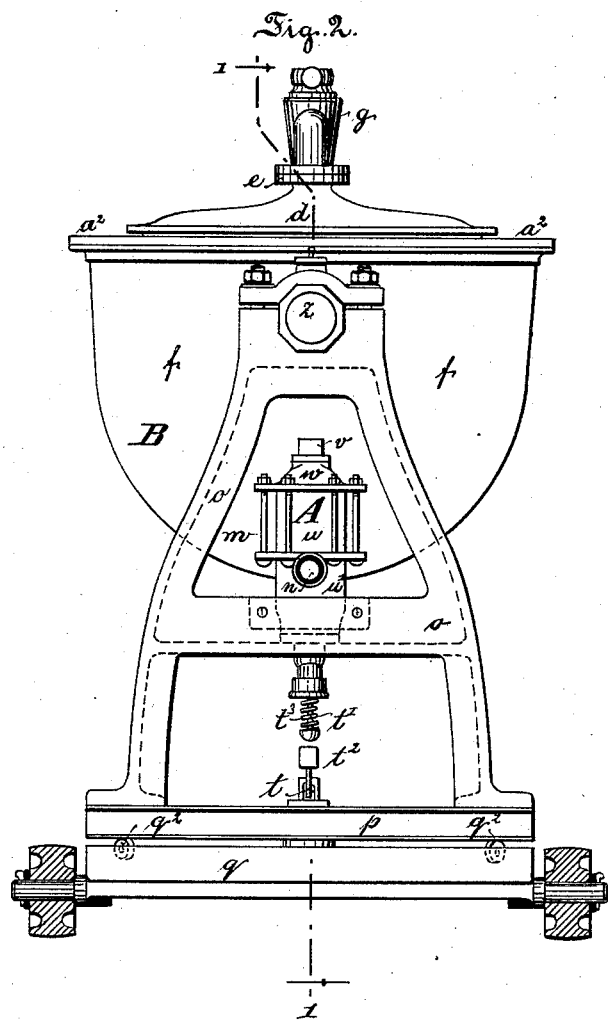

HEINRICH GEHRKE AND ADOLF WOHLFAHRT, OF BERLIN, GERMANY.

FILTERING APPARATUS.

SPECIFICATION forming part of Letters Patent No. 399,983, dated March 19, 1889.

Application filed January 18, 1888. Serial No. 261,156. (No model.) Patented in England June 30, 1888, No. 9,533.

*To all whom it may concern:*

Be it known that we, HEINRICH GEHRKE and ADOLF WOHLFAHRT, both of the city of Berlin, in the Kingdom of Prussia, German Empire, have invented a certain Improvement in Filtering Apparatus, of which the following is a specification.

This invention has been patented in Great Britain by Letters Patent No. 9,533, dated June 30, 1888.

The invention relates to filtering apparatus in general, and especially to apparatus for filtering beer used in drawing beer from the tuns into small kegs, and its object is not only to free the beer from impurities, but also to prevent the loss of carbonic acid during the process of drawing off and the formation of foam, and to remove at the same time any atmospheric air which may be contained in the beer. The apparatus may also be used advantageously for drawing off or filtering other fluids.

In the accompanying drawings, Figure 1 is a vertical axial section of the apparatus. Fig. 2 is a front elevation thereof, and Fig. 3 is a plan view.

The first part of our invention relates to the construction of the filter proper containing the filtering media.

We also provide means for withdrawing any air that may be contained in the beer before the latter is filtered. For this purpose we pass the beer while on its way to the filter through an automatic air-extractor of peculiar construction. Means are also provided for reducing or suppressing the foam that may be contained in the filtered beer and for further removing any air that may be in it, in order that the beer shall be filled into the keg clear and free from air or foam. To this end the beer is passed as it leaves the filter through a foam-destroyer, which causes the reabsorption of the foam, and which is also provided with an automatic air-extractor.

Referring to the drawings, A is the air-extractor. B is the filter, and C is the foam-destroyer. The latter is provided with a second air-extractor, A'. These three apparatus A, B, and C are all connected serially by piping, so that the beer as it is drawn from the tun passes first through the air-extractor A, then through the filter B, and, lastly, through the foam-destroyer C, from which it is run into the small kegs.

We will now proceed to describe in detail the precise construction shown in the drawings.

The beer flows from the tun to the air-extractor through a flexible hose, $n$, which is united by a coupling, $n'$, to the inlet-pipe $n^2$ of the air-extractor. The air-extractor is constructed with a glass cylinder, $u$, clamped tightly between a dome-shaped cover, $w$, and the cup-shaped lower part, $u'$, from the bottom of which latter part the outlet-pipe elbow $s'$ leads to a coupling, $s$. The cover $w$ has a central hole communicating with a lip-valve, $v$, of rubber, which may be of the usual construction. Within the chamber of the air-extractor is placed a rubber ball, $x$, the weight of which is such that it will float upon the beer when the apparatus is in action. When the inflow of beer commences, the ball $x$ is in the position shown in Fig. 1, and closes the outlet-opening, so that the beer will fill the entire chamber of the air-extractor and cannot escape through the pipe $s'$. When the operator sees that the air-extractor is sufficiently full, he unseats the ball $x$ by pressing upon a treadle, $t$, which throws up a hammer, $t^2$, against a pin, $t'$, which passes through a stuffing-box formed beneath the outlet-pipe $s'$. The blow of this hammer drives the pin $t'$ upward, so that its upper end lifts the ball $x$ from its seat. A spiral spring, $t^3$, presses down the pin $t'$, and the treadle $t$ is released. The ball $x$, when thus unseated, rises to the top of the mass of beer and seats itself against the outlet-hole leading to the lip-valve $v$, in order to prevent the escape of the beer through the lip-valve. The beer will then flow through the air-extractor, passing out at the outlet thereof and flowing to the filter B. Any atmospheric air contained in the fluid will accumulate in the upper part of the extractor A, and, being there imprisoned, will force down the level of the fluid until the ball $x$ is no longer upheld by the latter, whereupon the ball will descend, thereby opening the outlet and enabling the accumulated air to escape through the lip-valve $v$ until its reduced pressure allows the fluid to rise again in the chamber, whereupon the ball $x$ again closes the outlet-passage. This alternate rise and fall of the liquid and alternate closing and opening of the air-outlet continues during the entire time that the beer is flowing through the air-extractor and as long as there is any air to be expelled. When the last of the beer passes through, the ball $x$ sinks to the bottom of the chamber, so that it again closes the outlet-pipe $s'$, so that no air can pass into the latter. From the air-extractor the beer passes through the coupling $s$ and through a cock, $h$, and elbow-pipe $h'$ into the filter B.

The filter is constructed with an inlet pipe or opening, $a^4$, with a filter drum or receptacle, $b$, for containing the mass of filtering material, and with an intervening flaring or trumpet-shaped space or chamber, $m$, the smaller end of which coincides with the inlet-opening and the larger end of which is expanded to or nearly to the full area of the mass of filtering material in the receptacle $b$. The chamber $m$ is formed, by preference, of a shell, $a$, into which the filter-drum fits, being inserted therein against a shoulder, $a'$.

The filter-drum $b$ is made with flat perforated top and bottom ends, its perforated top being constructed as a removable lid. A dome-shaped cover, $d$, is fastened over the shell $a$, being held thereto by screws or bolts, and is formed with an internal flange, which presses upon the top of the filter-drum $b$ and holds the latter firmly in place within the shell $a$ and against the ledge or shoulder $a'$. To avoid the deflection of the perforated lid of the filter-drum under pressure, a number of rubber cushions or props, $d'$, are placed above it, bearing against the under side of the lid $d$.

The filter vessel or shell $a$ is inclosed by a kettle-shaped jacket, $f$, which is united at the top to a flange, $a^2$, formed on the shell $a$, and at the bottom to the inlet or neck $a^4$ thereof. The entire filter is hung upon trunnions $z\ z'$, which are attached to the jacket $f$ and turn in bearings in the pillow-frames $o\ o$, which are mounted upon the bed-frame $p$. In the flange $a^2$ are formed a number of hand-holes, $a^3$, Fig. 3, which are closed by caps.

The center of the cover $d$ is formed with an outlet-opening, which communicates by an elbow, $g'$, with a cock, $g$, from which a pipe, $j$, leads to a passage, $j'$, formed in the trunnion $z'$, and passing axially therethrough. The inlet-pipe $i$ of the foam-destroyer C has its larger end combed and ground to fit the end of the trunnion $z'$, being braced against the latter by a lug, $i'$. (Shown in Fig. 3.) This construction enables the filter to be turned on its trunnions without interrupting the connection between it and the foam-destroyer.

The filter-drum $b$ is filled with any suitable filtering material—such as bone-black, for example. The space or chamber $m$ is filled with some non-soluble material—such as wood-shavings, boiled straw, &c.—the function of which is to act as an obstruction in order to distribute the inflowing beer uniformly over the entire area of this space. The beer entering through the inlet $a^4$ rises through the chamber $m$, and, by reason of the trumpet-like shape thereof, and assisted by the obstruction therein, spreads out laterally and distributes itself over the entire area of the chamber, so that as it ascends it moves continually slower and finally enters the bottom of the filter-drum $b$ very slowly, but with a uniform pressure and moving at a uniform speed over its entire cross-section. The upward flow of the liquid through the filtering material is thus distributed uniformly throughout the mass and the formation of channels or passages for the easy flow of the fluid through the filtering material is avoided.

The function of the jacket $f$ is to enable the filter to be cooled or heated in order to maintain any desired temperature. This capability is very important, in view of the fact that glucose and certain other substances can be eliminated by filtration only at certain low temperatures, for which purpose, and as it is usually desirable to filter beer cold, the jacket $f$ is wholly or partially filled through the hand-holes $a^3$ with ice or a frigorific mixture, as may be desired, which after use may be drawn off by the cock $f'$. For filtering a fluid which requires a high temperature, the jacket $f$ may contain warm water or steam. The beer, after having passed through the filter-drum $b$, flows through the outlet of the cover $d$ and out through the elbow $g'$, cock $g$, pipe $j$, and through the passage $j'$ in the hollow trunnion into the pipe $i$, which conducts it to the foam-destroyer C.

The foam-destroyer is constructed of a hollow vessel or closed chamber, $k$, preferably of ovoidal shape, as shown, arranged with its long axis vertically, with the inlet-pipe $i$ terminating at the lower part of the vessel and turned outwardly, and with an outlet-pipe, $l$, the portion of which inside the vessel is bent after the manner of a trap, as shown, so that its mouth is turned upwardly. Any foam or air carried along by the beer will rise from the outlet of the pipe $i$, through the beer within the vessel $k$, to the top of the latter. The foam in thus rising through the beer will be reabsorbed by the latter; but the air, not being reabsorbed, will accumulate at the top of the chamber and is to be removed by an air-extractor. To this end the vessel $k$ is connected by a pipe, $r$, leading upward from its top to the air-extractor A', which is constructed similarly to the extractor A, except that the rubber ball $x$ is not permitted to seat itself upon the bottom opening. The air-extractor A' is constructed of a glass cylinder, $u$, clamped between two plates or heads, the lower one of which is secured to the pipe $r$, and the upper one, $w$, of which is formed with an outlet-opening leading to the lip-valve $v$ above it. The beer at first rises through the tube $r$ and through the vessel $u$, lifting the ball $x$ and causing it to close the outlet-opening;

but as the air accumulates it depresses the level of the beer and lowers the ball, thereby opening the outlet to the lip-valve and enabling the excess of air to escape, the operation being the same as before described with reference to the air-extractor $a$. Any of the foam that fails to be reabsorbed by the beer in the vessel $k$ will pass up into the air-extractor $A'$ and be reabsorbed therein. The outflowing beer passes through the pipe $l$ to the keg, which is not shown in the drawings, or to any other suitable receptacle. In order to save the residue of beer which remains in the filter at the end of the run and which will not flow out of itself, the filter is to be inverted in order to expel this contained residue. To perform this operation the cock $h$ is closed and the coupling $s$ unscrewed, whereupon the whole filter is turned upside down around the trunnions $z$ $z'$. The cock $h$ is then opened, whereupon most of the beer in the filter will flow off through the pipe $j$, and the small quantity which remains may be forced out by introducing water through the cock $h$.

The entire apparatus is mounted on a truck or carriage, so that it may be wheeled around from place to place and run into the narrow passages between the tuns in the cellar, and to facilitate the placing and connecting of the apparatus it is made to swivel upon the truck, so that the frame-work $o$ $o$ $p$, carrying the apparatus, may be turned independently of the truck. The truck-body $q$ is mounted on four small wheels, and the bed-frame $p$ is swiveled to it on a king-bolt, $q'$, friction-rollers $q^2$ being provided at intervals to facilitate the turning motion. The hammer $t^2$ and treadle $t$ for operating the unseating-pin $t'$ of the air-extractor $A$ are mounted upon the bed-frame $p$ of the machine. The air-extractor $A$ and foam-destroyer $C$ may be arranged in any convenient position, but are preferably fixed to the pillow-frames $o$ $o$ in substantially the manner shown in the drawings.

We are well aware that numerous filtering apparatus for beer and other substances are already known; but so far as we are aware they have all been constructed in different manner and upon other principles than the apparatus provided by our invention.

We are also aware that air-extractors have been made working with air-cocks or metallic valves, and that foam-destroyers have been used in connection with beer-filters, but of different and more complicated construction than that which we have devised.

We claim as our invention in filtering apparatus for beer or other liquids the following defined novel features or combinations, substantially as hereinbefore set forth, viz:

1. In a pressure-filter, the shell $a$, having an inwardly-projecting contraction or ledge, $a'$, and with an approximately trumpet-shaped portion between said ledge and the inlet-opening, in combination with a removable receptacle, $b$, containing filtering material, which fits within said shell and rests against said ledge, said receptacle having a perforated bottom and a removable perforated top, a cover, $d$, having an outlet-opening, said cover fitting over the larger end of said shell and bearing against said receptacle, and elastic cushions or props $d'$ between the cover $d$ and the top of said receptacle.

2. The combination, with a beer-filter, of an air-extractor consisting of a chamber communicating with the pipe or passage through which the beer flows, an outlet-opening at the top of said chamber, and a float-valve within said chamber adapted to rise and close said outlet upon the rise of the level of the beer therein.

3. The combination, with a beer-filter, of an air-extractor consisting of a chamber in communication with the pipe through which the beer flows, an outlet-opening from the top of said chamber, a lip-valve opening outwardly from said opening, and a float-valve in said chamber adapted, when lifted by the rise of the liquid therein, to close said outlet-opening.

4. The combination, with a beer-filter, of an air-extractor consisting of a chamber in communication with the pipe through which the beer flows, an air-outlet opening from the top of said chamber, and a float-valve in said chamber consisting of an elastic ball adapted, when lifted by the rise of liquid in said chamber, to close said outlet-opening.

5. The combination, with a beer-filter, of an air-extractor for removing the air from the beer before it passes through the filter, consisting of a chamber formed with a beer-inlet at its side, a beer-outlet at its bottom leading to the filter, and an air-outlet opening at its top, and a float-valve in said chamber, consisting of an elastic ball adapted to close either said beer-outlet at the bottom or said air-outlet at the top.

6. In a beer-filter, an air-extractor chamber, an inlet-pipe opening into the same, and an outlet-pipe leading from the bottom thereof, and a float ball-valve which closes said outlet-passage, in combination with an automatically-acting elastic air-outlet lip-valve at the top of said chamber opening outwardly therefrom, the opening to said lip-valve being closed by said float-valve when the liquid rises in said chamber.

7. The combination, with a beer-filter, of an air-extractor for removing the air from the beer before the latter passes to the filter, consisting of a chamber formed with a beer-inlet, an air-outlet at its top, and a beer-outlet at its bottom leading to the filter, a valve in said chamber adapted to close said outlet, a sliding pin beneath said valve and passing out through a stuffing-box, and a lever for forcibly moving said pin against said valve inside the latter.

8. The combination, with a beer-filter, of a foam-destroyer consisting of a closed vessel, the outlet-pipe from the filter opening outwardly into the lower part of said vessel, and an outlet-pipe from said vessel opening upwardly therein.

9. The combination, with a beer-filter, of a foam-destroyer consisting of a closed chamber or vessel, an inlet-pipe connecting said filter with said vessel, the outlet-mouth of said pipe opening into said vessel below the liquid-level thereof, and an outlet-pipe leading from said vessel, with its receiving-mouth below the liquid level.

10. The combination, with a foam-destroyer consisting of a closed vessel, with a beer-inlet pipe opening outwardly in the lower part thereof and a beer-outlet pipe opening upwardly therein, of a pipe extending upwardly from the upper part of said chamber, and an air-extractor consisting of a chamber into which said pipe opens formed with an air-outlet at its top and provided with a float-valve therein adapted, when lifted by the rise of said liquid, to close said outlet.

11. In a beer-filter, an air-extractor chamber, an inlet-pipe opening into the same, an outlet-pipe leading therefrom, and a float ball-valve which closes said outlet-passage, in combination with a sliding pin adapted when lifted to unseat said valve, a retracting-spring for said pin, a treadle, and a hammer pivoted to said treadle and adapted to strike said sliding pin on the depression of the treadle.

This specification signed by us this 29th day of November, 1887.

HEINRICH GEHRKE.
ADOLF WOHLFAHRT.

Witnesses:
CHAPMAN COLEMAN,
CARL T. BURCHARDT.